Dec. 2, 1969  D. L. UDESEN  3,481,063
MULTIPLE PHOTOGRAPH MOUNT
Filed Aug. 30, 1967  2 Sheets-Sheet 1

INVENTOR.
DUANE L. UDESEN
BY
Carlsen, Carlsen, Sturm & Wickes
ATTORNEYS

Dec. 2, 1969  D. L. UDESEN  3,481,063
MULTIPLE PHOTOGRAPH MOUNT
Filed Aug. 30, 1967  2 Sheets-Sheet 2
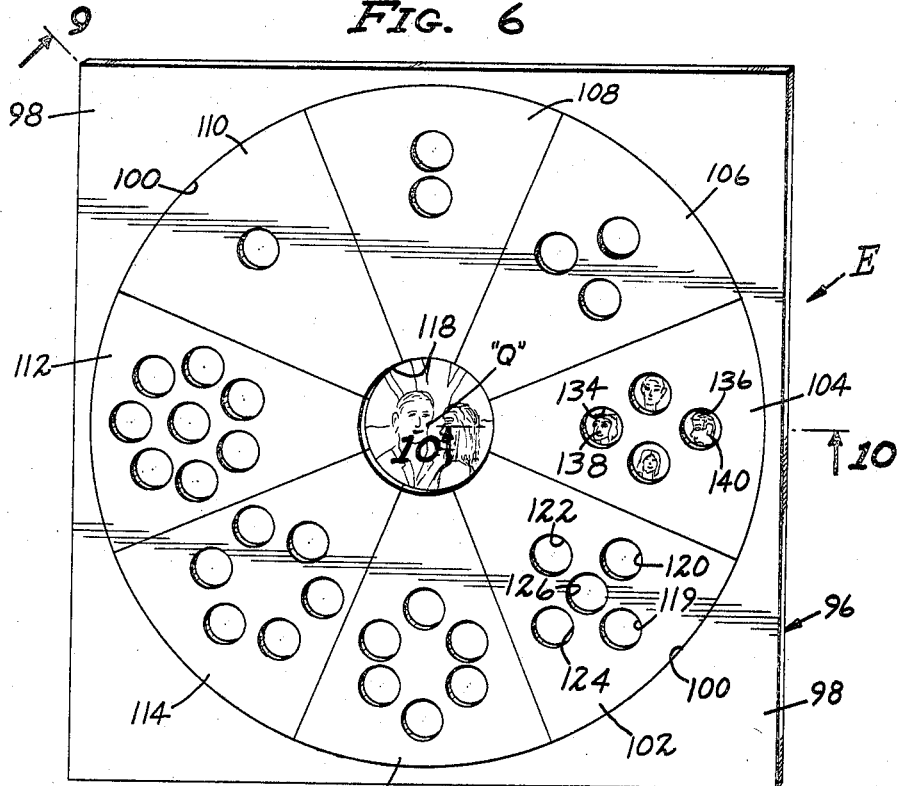
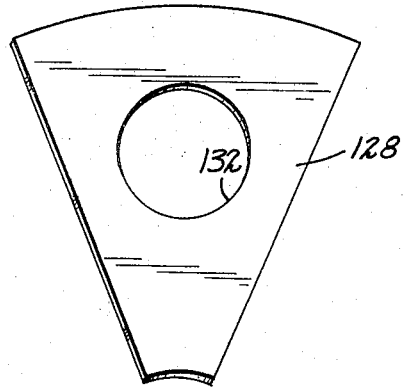
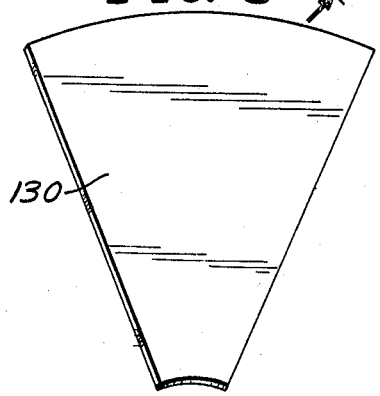
INVENTOR.
DUANE L. UDESEN
BY
Carlsen, Carlsen, Sturm & Wickr
ATTORNEYS

United States Patent Office 3,481,063
Patented Dec. 2, 1969

3,481,063
MULTIPLE PHOTOGRAPH MOUNT
Duane L. Udesen, 324 N. 60th Ave. E.,
Duluth, Minn. 55804
Filed Aug. 30, 1967, Ser. No. 664,395
Int. Cl. G09f 1/10
U.S. Cl. 40—158                                    9 Claims

ABSTRACT OF THE DISCLOSURE

The disclosure relates to a multiple photograph mount which includes a flat base having a recessed area or areas into which fit insert segments. The insert segments are all the same size and interchangeable. One or more of the segments has one or more openings extending therethrough. A photograph is mounted on the rear face of each segment opposite the opening thereof whereby the photograph is viewed through the opening from the front face of the insert segment.

SUMMARY OF THE INVENTION

Many families and other groups have a collection of snapshots which they desire to mount, but it is impractical to frame each picture individually and to place several pictures in one frame looks unattractive. The invention relates to a multiple photograph mount and more particularly to a mount having a plurality of segments equal in size, removable and interchangeable. Each segment is formed with a different number and configuration of openings behind each of which may be positioned a photograph and the inserts mounted on a base. Members of families, corporate officers and employees, for example, may be selectively grouped by mounting photographs at the various openings. The user can select from a variety of inserts, that is, those inserts which have the correct size and grouping of picture openings to suit the particular needs. With the interchangeability the photographs and inserts may be changed to fit changing needs.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of examples preferred embodiments of the inventive idea wherein like numerals refer to like parts throughout.

FIG. 6 is a top plan view of a second embodiment of a multiple photographic mount embodying the invention.

FIG. 7 is a perspective view of an insert segment removed from the mount.

FIG. 8 is a perspective view of a further insert segment formation removed from the mount.

FIG. 9 is a sectional view on the line 9—9 of FIG. 6.

FIG. 10 is a sectional view on the line 10—10 of FIG. 6.

Figure 1:
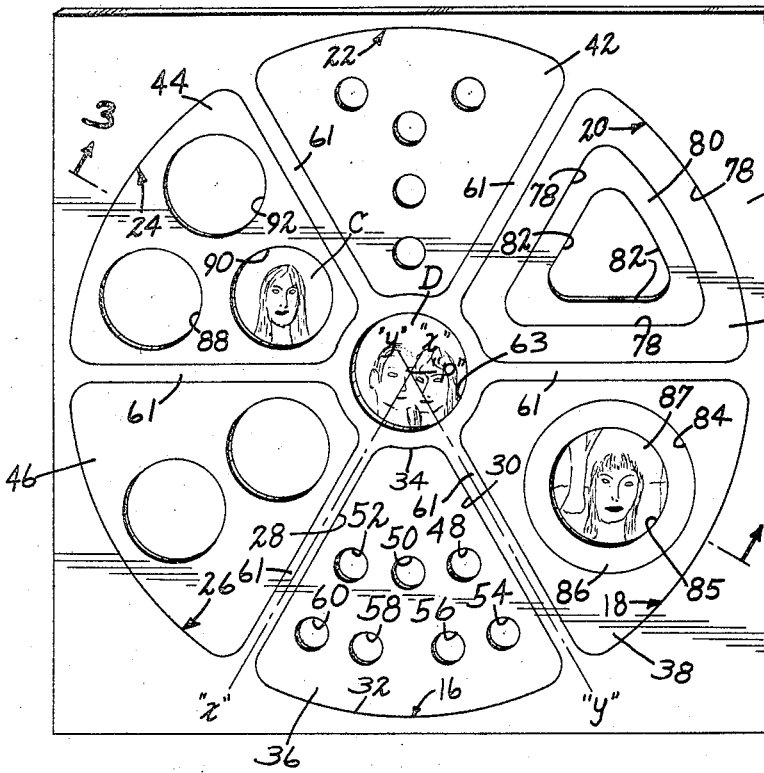
FIG. 1 is a top plan view of a first embodiment of a multiple photograph mount embodying the invention.

Referring to the drawings in detail, the multiple photographic mount A includes the base 10 made up of the lower flat base portion 12 on the top surface of which is secured the upper flat base portion 14. The upper base portion 14 is formed with a plurality of segmental openings 16, 18, 20, 22, 24 and 26, the center line of each formed on a radius. Each opening is identical in size and therefore only opening 16 will be described in detail. Opening 16 includes the converging side edges 28 and 30 each of which is substantially parallel to a radius such as "x" and "y" which extend from the central point "P" which forms the reference point of the arcuate scribed outer edge 32 of the opening 16, the side edges 28 and 30 terminating in the arcuate edge 32 at the outer ends thereof and at the inner ends terminating in the inner arcuate edge 34 which forms the opening 16. The edge 34 is parallel to the edge 32.

Further provided is the insert segment 36 the outline of which is that of the opening 16 and such that the segment frictionally fits in the opening 16. Identical segmental inserts 38, 40, 42, 44 and 46 are provided which frictionally fit in the openings 18, 20, 22, 24 and 26, respectively.

The insert 36 has formed therein the openings 48, 50, 52, 54, 56, 58 and 60, and the rear face of the insert has attached thereto the thin sheet backing member 62. Each of the inserts is spaced one from the other and separated by a divider or web 61 which is on a radius from point P, and formed centrally of the upper base portion 14 is the circular opening 63 spaced from the inner arcuate edges 34.

Figure 5:
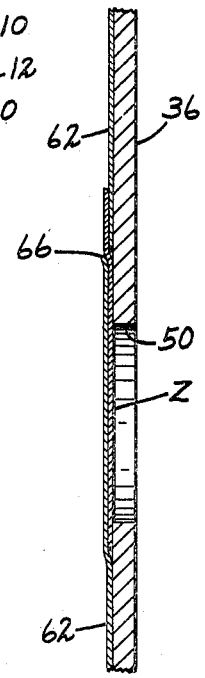
FIG. 5 is a sectional view on the line 5—5 of FIG. 4.
Figure 2:
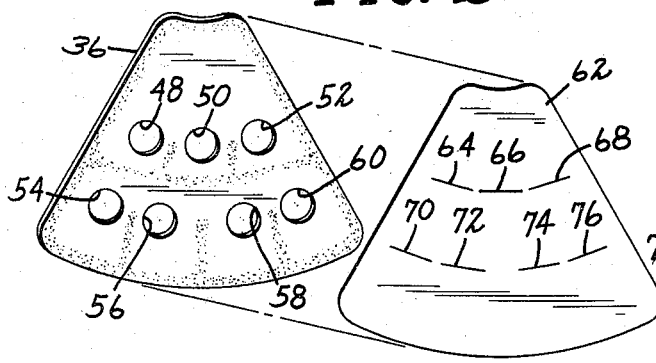
FIG. 2 is an exploded perspective view of one of the insert segments removed from the mount.
Figure 4:
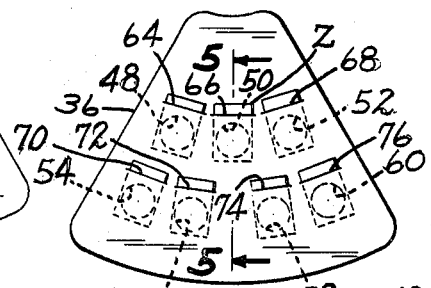
FIG. 4 is a rear view of one of the insert segments removed from the mount.

The member 62 is the same outline configuration as the insert 36 and has formed therein the slits 64, 66, 68, 70, 72, 74 and 76 which are so located on member 62 that the same are positioned inwardly of and adjacent openings 48–60, respectively, see FIGS. 4 and 5 in particular. Further the slits are positioned on an extension of a diameter of an opening. With the backing sheet 62 formed with the slits described a small photograph such as Z can be inserted through the slit 66 with the image thereon opposite the opening 50 with a portion of the photograph extending outwardly from the slit, FIG. 4, for removal. The photograph is held in position opposite the opening 48 by friction as a result of the backing member secured flat upon the segment piece 36. Inserts 38, 40, 42, 44 and 46 are constructed in a manner similar to insert 36. Insert 40 has formed therein the triangular-shaped opening 78 in which is frictionally fit the frame member 80 having the opening 82 behind which a photograph is mounted. The frame 80 together with the photo carried thereby is easily removed from and replaced in the opening 78.

Insert 42 is similar to insert 36 but with a different formation of openings.

Figure 3:
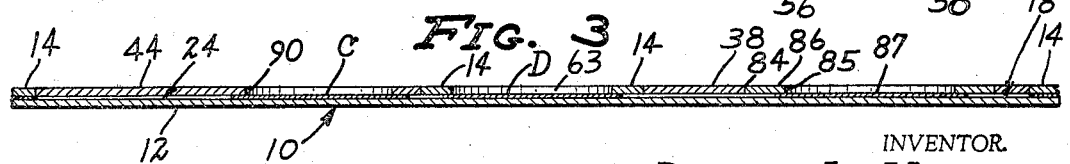
FIG. 3 is a sectional view on the line 3—3 of FIG. 1.

Insert 38 is formed with a circular opening 84 in which is fictionally fit the ring 86 having the opening 85 and on the back of which photo 87 is mounted for viewing from the front through the opening 85. Insert 44 is formed with three openings 88, 90 and 92 back of which may be mounted a photograph C in the manner shown in FIG. 3 relative to opening 90. A photograph D is secured to the underside of 14 and is positioned in alignment with opening 63.

As an instance of use of the mount A photographs of a given family may be mounted behind the openings 48–60 of segment 36 with other relations such as cousins mounted behind the openings of segment 42 with still other relatives' photographs mounted behind openings in remaining segments. The segments are interchangeable whereby the photo groups may be changed and the individual photos changed. A segment with more or less openings may be used depending upon the number of photos in a given group.

A further embodiment of the invention is disclosed in FIGS. 6–10 wherein the multiple photograph mount E includes the base 96 made up of the flat member 98. The member 98 has formed in the upper face thereof the circular recess 100 into which fits the identical eight segments, 102, 104, 106, 108, 110, 112, 114, and 116, each segment being foreshortened at the inner end to from the central opening 118. The converging edges of each segment are formed on a radius from point "Q" to the edge of the circular recess 100. Thus, when all of the segments are in position the same are held together and resist removal. Each of the segments is identical to the other except for the number and formation of openings therein so that only segment 102 will be described in detail. The segment 102 has formed therein the openings 119, 120, 122, 124, and 126 beneath which photos R*a*, R*b* and R*c*, respectively, may be mounted, for example.

The segments 128 and 130 shown in FIGS. 7 and 8, respectively, are identical to the segments of FIG. 6 except that segment 128 is formed with a single relatively large opening 132 behind which a relatively larger photo may be mounted. Segment 130 is what may be called a "blank" segment having no openings and may replace any of the segments in FIG. 6 to give proper spacing of selected groups or in a position when a sufficient number of groups are not available.

FIG. 10 shows openings 134 and 136 of segment 104 with an illustration of securing photos behind openings such as photo 138 secured behind opening 134 and a photo 140 secured behind opening 136. Photos are similarly secured behind the openings of the other segments. As an instance of use of the mount E photographs of a given family may be mounted behind the openings 118–124 of segment 102 with other relatives behind openings of segment 104 with still other relatives behind openings of other segments. The segments are interchangeable as pointed out whereby the photo groups may be changed and the individual photos changed. Insert segments may be selected according to the number of openings in each segment to fit the particular need of the user in relation to the number of openings needed for the particular groupings desired.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A multiple photograph mount comprising
   (a) base,
   (b) said base having circular recess means formed therein,
   (c) a plurality of insert segments, each having opposed converging edges formed parallel to the radii of the circular recess means,
   (d) said recess means having a configuration adapted to receive said insert segments in frictional engagement therein at the edges of the segments,
   (e) at least one of said insert segments having at least one opening extending therethrough and through which the image of a photo can be viewed which is secured to the rear side of the insert segment.

2. The device of claim 1 in which
   (a) said base is a substantially flat member.
3. The device of claim 2 in which
   (a) said insert segments are substantially flat members.
4. The device of claim 3 in which
   (a) said recess means is circular in configuration.
5. The device of claim 4 in which
   (a) an edge of each insert segment is formed with a radius equal to that of said circular recess means.
6. The device of claim 5 in which
   (a) each of said insert segments is formed with opposed converging edges extending from said first mentioned edge, said converging edges formed parallel to radii of said circular recess for abutting frictional contact with
   (b) a divider portion formed on said base on a radii of said circular recess.
7. The device of claim 5 in which
   (a) the converging edges of said insert segments are formed on a radius of said circular recess common to said edges and the converging edges of an adjacent insert segment whereby the inserts are in abutting frictional engagement each with the other within said circular recess.
8. The device of claim 5 in which
   (a) the inward end of each of said insert segments is spaced from the center of said circular recess whereby the inward ends collectively form an opening axially of the circular recess.
9. A multiple photograph mount comprising:
   (a) a base including a lower base portion and,
   (b) an upper base portion secured upon said lower base portion,
   (c) said upper base portion having a circular opening formed therein,
   (d) a plurality of insert segments,
   (e) an edge of each insert segment formed with a radius equal to that of the circular opening and frictionally engaged with the edge of the circular opening,
   (f) each of said inserts formed with opposed converging edges extending from said first mentioned edge, said converging edges formed parallel to radii of said circular opening for abutting frictional contact with
   (g) a divider portion formed on said base on a radii of said circular recess,
   (h) at least one of said insert segments having at least one opening extending therethrough and through which the image of a photo can be viewed which is secured to the rear side of the insert segment.

References Cited
UNITED STATES PATENTS

| | | | |
|---|---|---|---|
| 1,006,049 | 10/1911 | Bell | 40—158 |
| 2,334,176 | 11/1943 | De Sherbinin. | |
| 2,593,195 | 4/1952 | Rosenberg | 40—158 |
| 2,828,567 | 4/1958 | Shoan | 129—20 X |

EUGENE R. CAPOZIO, Primary Examiner

W. J. CONTRERAS, Assistant Examiner